United States Patent
Nemoto et al.

(10) Patent No.: US 9,774,042 B2
(45) Date of Patent: Sep. 26, 2017

(54) METAL PHTHALOCYANINE POLYMER AND ELECTRODE CATALYST PRODUCED USING THE SAME, AND PRODUCING METHODS THEREOF

(71) Applicant: Ihara Chemical Industry Co., Ltd., Tokyo (JP)

(72) Inventors: Nobukatsu Nemoto, Tokyo (JP); Izuru Kobayashi, Tokyo (JP); Kazuto Umezu, Tokyo (JP); Masaji Akimoto, Tokyo (JP)

(73) Assignee: KUMIAI CHEMICAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/784,337

(22) PCT Filed: Apr. 11, 2014

(86) PCT No.: PCT/JP2014/060470
§ 371 (c)(1),
(2) Date: Oct. 14, 2015

(87) PCT Pub. No.: WO2014/175077
PCT Pub. Date: Oct. 30, 2014

(65) Prior Publication Data
US 2016/0036066 A1  Feb. 4, 2016

(30) Foreign Application Priority Data
Apr. 24, 2013  (JP) .................... 2013-091173

(51) Int. Cl.
*H01M 4/90* (2006.01)
*B01J 31/22* (2006.01)
(Continued)

(52) U.S. Cl.
CPC .......... *H01M 4/9083* (2013.01); *B01J 31/22* (2013.01); *C08F 226/06* (2013.01); *C08G 69/42* (2013.01);
(Continued)

(58) Field of Classification Search
CPC ...................................... H01M 4/90
(Continued)

(56) References Cited

FOREIGN PATENT DOCUMENTS

JP   2255726 A   10/1990
JP   7324170 A   12/1995
(Continued)

OTHER PUBLICATIONS

Chen et al; SA/CS bipolar membrane—substituents; Jan. 2013; Huagong Xuebao (2010), 61(S1), 126-131; Chem Abstract 159: 50029.*

(Continued)

*Primary Examiner* — Duc Truong
(74) *Attorney, Agent, or Firm* — The Webb Law Firm

(57) ABSTRACT

The present invention relates to a metal phthalocyanine polymer that includes a repeating structural unit obtained by amide bonding of a structural unit represented by the following general formula (1a) to a structural unit represented by the following general formula (2a):

(Continued)

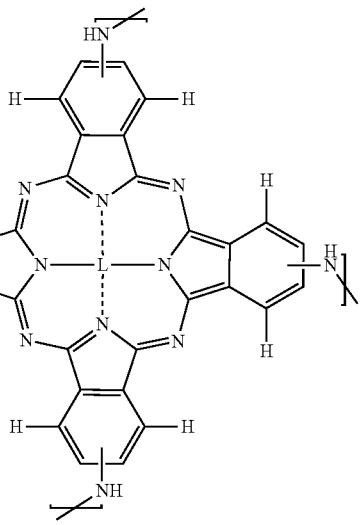

(1a)

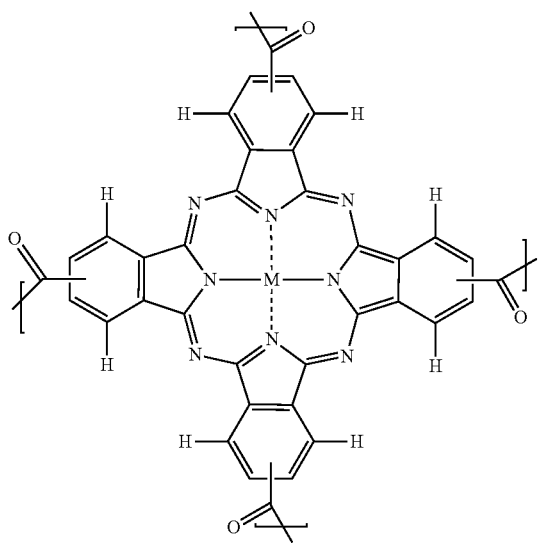

(2a)

With general formula (1a), L is a divalent or trivalent metal ion belonging to Period 3 to Period 5 on the long-form periodic table. With general formula (2a), M is a divalent or trivalent metal ion belonging to Period 3 to Period 5 on the long-form periodic table.

21 Claims, 6 Drawing Sheets

(51) Int. Cl.
| | | |
|---|---|---|
| C08G 69/42 | (2006.01) | |
| C08G 73/06 | (2006.01) | |
| C08L 79/04 | (2006.01) | |
| H01M 4/88 | (2006.01) | |
| C08F 226/06 | (2006.01) | |
| B01J 31/20 | (2006.01) | |
| H01M 8/1018 | (2016.01) | |

(52) U.S. Cl.
CPC .......... *C08G 73/0672* (2013.01); *C08L 79/04* (2013.01); *H01M 4/88* (2013.01); *H01M 4/8882* (2013.01); *H01M 4/9008* (2013.01); *H01M 2008/1095* (2013.01)

(58) Field of Classification Search
USPC .......................... 526/259; 502/185; 528/423
See application file for complete search history.

(56) References Cited

FOREIGN PATENT DOCUMENTS

| JP | 20116283 A | 1/2011 |
| JP | 2011516254 A | 5/2011 |
| WO | 2009124905 A1 | 10/2009 |

OTHER PUBLICATIONS

Zhao et al; Method for preparing—dicarboxylic acid; Nov. 2011; Faming Zhuanli Shenqing, Chem Abstract 155: 656789.*

* cited by examiner

METAL PHTHALOCYANINE POLYMER AND ELECTRODE CATALYST PRODUCED USING THE SAME, AND PRODUCING METHODS THEREOF

CROSS-REFERENCE TO RELATED APPLICATIONS

This application is the United States national phase of International Application No. PCT/JP2014/060470 filed Apr. 11, 2014, and claims priority to Japanese Patent Application No. 2013-091173 filed Apr. 24, 2013, the disclosures of which are hereby incorporated in their entirety by reference.

TECHNICAL FIELD

The present invention relates to a metal phthalocyanine polymer useful as a synthetic polymer material such as raw materials of an electrode catalyst for fuel cell and an electrode catalyst using the same, and producing methods thereof.

BACKGROUND ART

Currently, fossil fuels are used as a main energy source. However, fossil fuels are finite. Furthermore, fossil fuels have a problem that carbon dioxide generated when it is used increases greenhouse effect. Therefore, development of energy source in place of fossil fuels is desired. One of new energy sources includes a fuel cell.

Compared to primary batteries and secondary batteries, a fuel cell is a power generator semipermanently usable by continuously supplying hydrogen and oxygen as fuel. A fuel cell has attracted also because the fuel can be reused. Among them, polymer electrolyte fuel cell (PEFC) operates at low temperatures, and reduction in size and weight is possible since its electrolyte is thin-film like. Thus, PEFC is expected to be applied to home electric appliances, mobile devices, automobile battery, and the like. PEFC has a structure in which an electrolyte film is sandwiched between two electrodes, cathode (positive electrode) and anode (negative electrode). In PEFC, fuels, such as oxygen to a positive electrode and hydrogen to a negative electrode, are supplied, and an electric energy can be obtained from a chemical reaction caused in the electrode.

The cathode of the fuel cell carries an electrode catalyst, and catalyzes a reaction to reduce oxygen to water. The reaction rate of oxygen reduction reaction on the cathode side is relatively low, thus a catalyst for efficiently operating the reaction is necessary. As the electrode material, carbon-based electrode materials and the like are known, and a platinum-containing catalyst is currently most effective as a carbon-based electrode catalyst for efficiently operating a fuel cell. However, since platinum is a noble metal, a problem on costs is pointed out. Therefore, creation of a novel catalyst not using platinum has been expected.

Incidentally, the important thing in the creation of the carbon-based electrode catalyst is to create a carbon material having high conductivity, wide surface area, and good dispersibility, and metal is finely dispersed in the material. As one of the base material of such carbon material, phthalocyanine is known (for example, refer to Patent Literature 1). The carbon material described in this document is obtained by calcining hyperbranched metal phthalocyanine comprising a specific repeating unit in an inert gas atmosphere. The metal ion constituting phthalocyanine core of this repeating unit is selected from the group consisting of $Fe^{2+}$, $Co^{2+}$ and $Ni^{2+}$, thus is characterized in that it is not necessary to use expensive noble metal such as platinum.

Phthalocyanine is known to include many coordinating elements for fixing metal. Since phthalocyanine has a giant cyclic structure in which the whole molecule forms conjugated double bond system, the structure and bonding thereof are extremely stable, and phthalocyanine coordinates with a metal ion such as transition metals at its center, and phthalocyanine forms a stable metal phthalocyanine complex. The advantages of using metal phthalocyanine as an electrode material include that it can stably fix metal, namely, it can be suggested that metal arrangement can be controlled at nano level. Furthermore, the advantages of using metal phthalocyanine as a precursor of a metal carrying carbon material include that the carbon content is high. Namely, when phthalocyanine is calcined to form a carbonized material, the carbon content of the electrode can be enhanced.

CITATION LIST

Patent Literature

Patent Literature 1: JP 2011-6283 A (claim 1, etc.)

SUMMARY OF THE INVENTION

Technical Problem

In the catalyst material described in Patent Literature 1, a constituent unit derived from phenols is required other than metal phthalocyanine, as described in the formula (I) of the paragraph 0023. However, hyperbranched metal phthalocyanine of Patent Literature 1 has a bonding in which the constituent unit derived from phenols is interposed (—O—Ar—O—) or a bonding in which it is not interposed (—O—) between adjacent metal phthalocyanines, thus lacks the regularity of metal arrangement. Also, it is preferred to have a simpler constituent unit, from the viewpoint of industrialization. On this point, there was a room for improvement on the compound described in Patent Literature 1.

In addition, as a more preferred method for search of a cooperative effect of a different metal, there was a room for improvement on the invention described in Patent Literature 1. More specifically, the hyperbranched metal phthalocyanine described in Patent Literature 1 contains only one type of metal phthalocyanine, thus cannot be used as a precursor compound for searching a cooperative effect of two or more types of metals.

An object of the present invention is to provide a novel metal phthalocyanine polymer that is particularly preferably used as a precursor of an electrode catalyst material, does not use expensive platinum, comprises simple constituent unit in which metal is regularly arranged, and can be preferably used also for search of a cooperative effect of a different metal as necessary. In addition, another object of the present invention is to provide an electrode catalyst that does not use expensive platinum, has high carbon content and high metal dispersibility, and also can contain a different metal as necessary. Furthermore, another object of the present invention is to provide a method for producing a metal phthalocyanine polymer and an electrode catalyst having the above characteristics.

Solution to Problem

In consideration of the above-mentioned circumstances, the present inventors have intensively investigated about an electrode catalyst material. As the result, the present inventors have unexpectedly found that a metal phthalocyanine polymer having an amide structure by condensation of a metal aminophthalocyanine compound represented by the general formula (1) set forth below and a metal carboxyphthalocyanine compound represented by the general formula (2) set forth below can be produced. Furthermore, the present inventors have unexpectedly found that a carbon material obtained by calcining the metal phthalocyanine polymer in the specific conditions has definite catalyst activity of oxygen reduction. The present inventors have completed the present invention, based on this knowledge.

More specifically, the present invention relates to a metal phthalocyanine polymer comprising a repeating structural unit obtained by the amide bonding of a structural unit represented by general formula (1a) to a structural unit represented by general formula (2a).

[Chemical Formula 1]

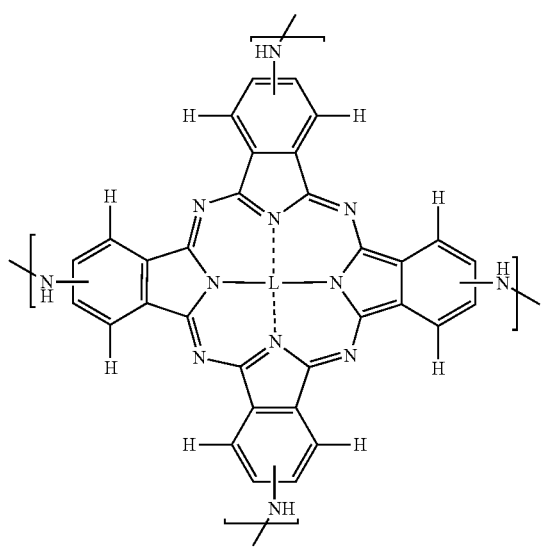

(1a)

(wherein L is a divalent or trivalent metal ion belonging to Period 3 to Period 5 on the long-form periodic table.)

[Chemical Formula 2]

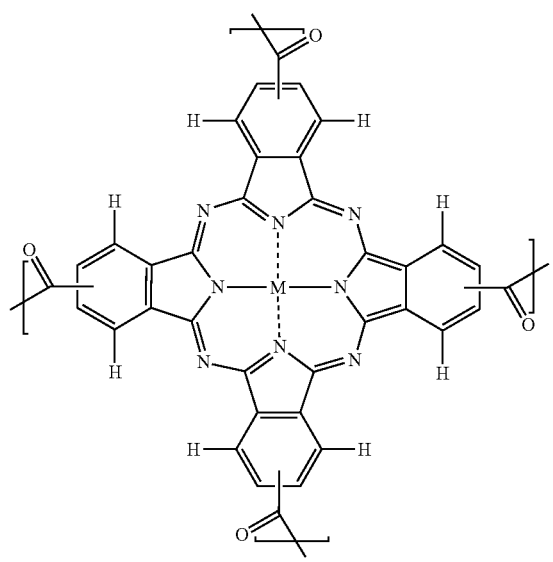

(2a)

(wherein M is a divalent or trivalent metal ion belonging to Period 3 to Period 5 on the long-form periodic table.)

In this case, it is preferred that the L and the M are each independently a metal ion selected from the group consisting of $Co^{2+}$, $Ni^{2+}$ and $Fe^{2+}$. Furthermore, it is preferred that the L and the M are $Co^{2+}$, the L is $Co^{2+}$ and the M is $Ni^{2+}$, or the L is $Co^{2+}$ and the M is $Fe^{2+}$.

Also, the present invention is a metal phthalocyanine polymer produced by condensation of a metal aminophthalocyanine compound represented by general formula (1) and a metal carboxyphthalocyanine compound represented by general formula (2).

[Chemical Formula 3]

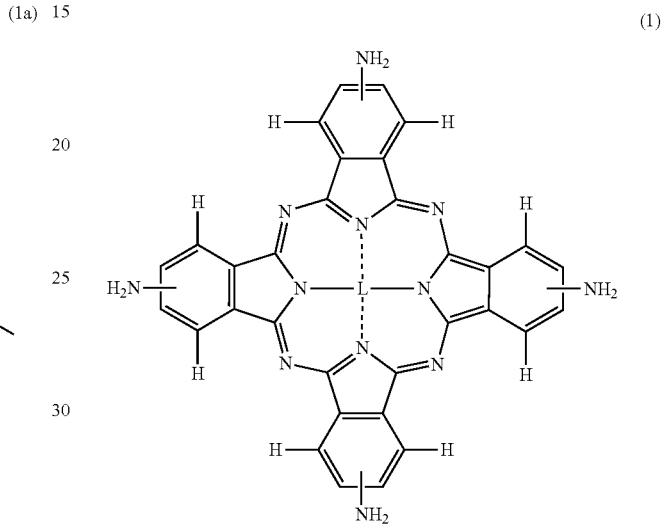

(1)

(wherein L is a divalent or trivalent metal ion belonging to Period 3 to Period 5 on the long-form periodic table.)

[Chemical Formula 4]

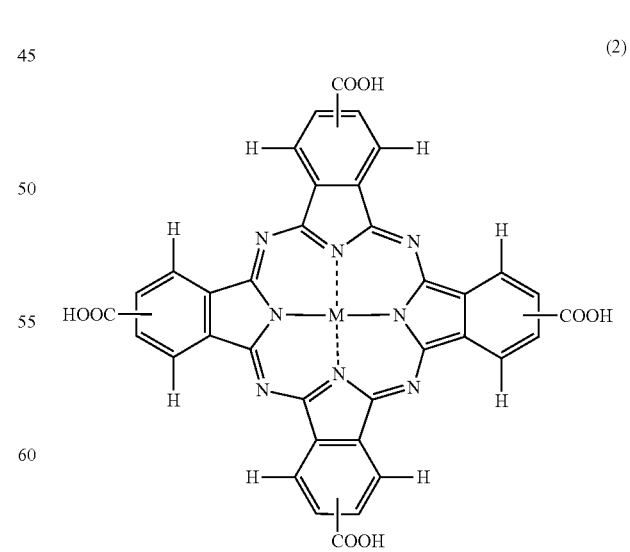

(2)

(wherein M is a divalent or trivalent metal ion belonging to Period 3 to Period 5 on the long-form periodic table.)

In this case, it is preferred that the L and the M are each independently a metal ion selected from the group consisting of $Co^{2+}$, $Ni^{2+}$ and $Fe^{2+}$. Furthermore, it is preferred that the L and the M are $Co^{2+}$, the L is $Co^{2+}$ and the M is $Ni^{2+}$, or the L is $Co^{2+}$ and the M is $Fe^{2+}$.

In addition, the present invention is an electrode catalyst produced by calcining the metal phthalocyanine polymer as defined in any of the above, at 650° C. to 1500° C., in a reducing gas atmosphere or an inert gas atmosphere.

Alternatively, the present invention is an electrode catalyst produced by calcining the metal phthalocyanine polymer as defined in any of the above, at 800° C. to 1000° C., in a reducing gas atmosphere or an inert gas atmosphere.

Or, the present invention is an electrode catalyst produced by calcining the metal phthalocyanine polymer as defined in any of the above, at 800° C. to 1000° C., in a reducing gas atmosphere.

Moreover, the present invention is a method for producing a metal phthalocyanine polymer comprising a repeating structural unit obtained by the amide bonding of a structural unit represented by general formula (1a) to a structural unit represented by general formula (2a), comprising condensing a metal aminophthalocyanine compound represented by general formula (1) and a metal carboxyphthalocyanine compound represented by general formula (2).

[Chemical Formula 5]

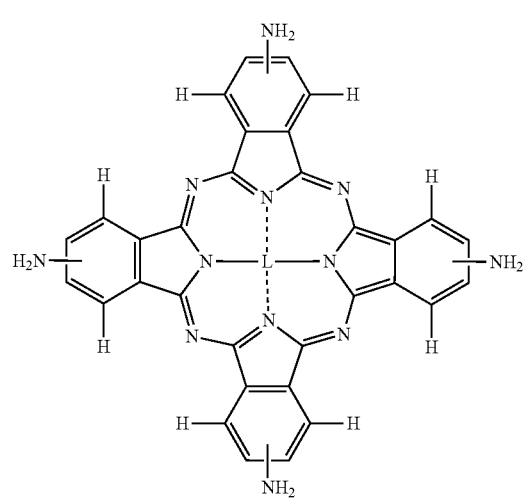

(1)

(wherein L is a divalent or trivalent metal ion belonging to Period 3 to Period 5 on the long-form periodic table.)

[Chemical Formula 6]

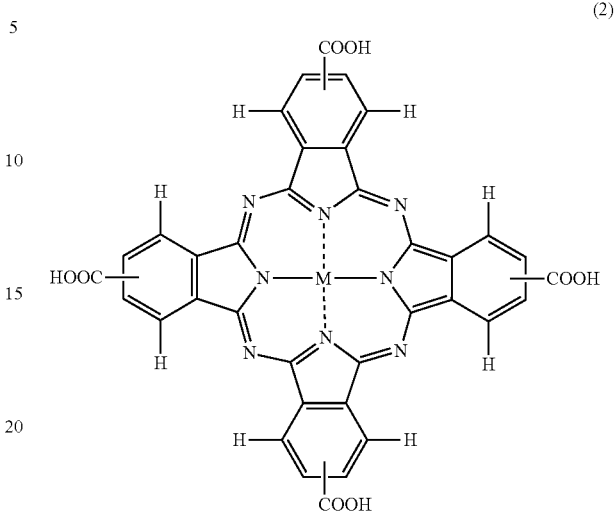

(2)

(wherein M is a divalent or trivalent metal ion belonging to Period 3 to Period 5 on the long-form periodic table.)

[Chemical Formula 7]

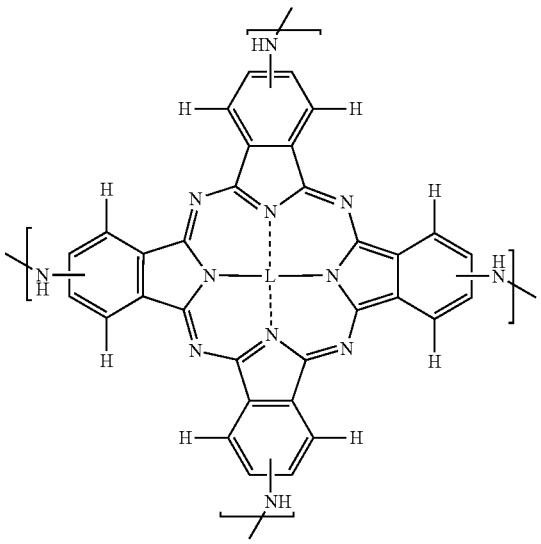

(1a)

(wherein L is a divalent or trivalent metal ion belonging to Period 3 to Period 5 on the long-form periodic table.)

[Chemical Formula 8]

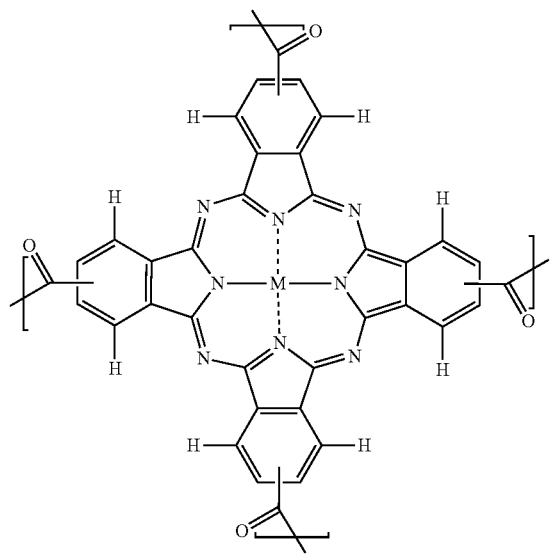

(2a)

(wherein M is a divalent or trivalent metal ion belonging to Period 3 to Period 5 on the long-form periodic table.)

In this case, it is preferred that the L and the M are each independently a metal ion selected from the group consisting of $Co^{2+}$, $Ni^{2+}$ and $Fe^{2+}$. Furthermore, it is preferred that the L and the M are $Co^{2+}$, the L is $Co^{2+}$ and the M is $Ni^{2+}$, or the L is $Co^{2+}$ and the M is $Fe^{2+}$.

In addition, the present invention is a method for producing an electrode catalyst which comprises calcining the metal phthalocyanine polymer as defined in any of the above, at 650° C. to 1500° C., in a reducing gas atmosphere or an inert gas atmosphere.

Alternatively, the present invention is a method for producing an electrode catalyst which comprises calcining the metal phthalocyanine polymer as defined in any of the above, at 800° C. to 1000° C., in a reducing gas atmosphere or an inert gas atmosphere.

Or, the present invention is a method for producing an electrode catalyst which comprises calcining the metal phthalocyanine polymer as defined in any of the above, at 800° C. to 1000° C., in a reducing gas atmosphere.

Advantageous Effects of Invention

As described above, according to the present invention, it is possible to provide a novel metal phthalocyanine polymer that is particularly preferably used as a precursor of an electrode catalyst material, does not use expensive platinum, comprises simple constituent unit in which metal is regularly arranged, and can be preferably used also for search of a cooperative effect of a different metal as necessary. In addition, according to the present invention, it is possible to provide an electrode catalyst that does not use expensive platinum, has high carbon content and high metal dispersibility, and also can contain a different metal as necessary. Furthermore, according to the present invention, it is possible to provide a method for producing a metal phthalocyanine polymer and an electrode catalyst having the above characteristics.

DESCRIPTION OF THE EMBODIMENTS

Figure 1:
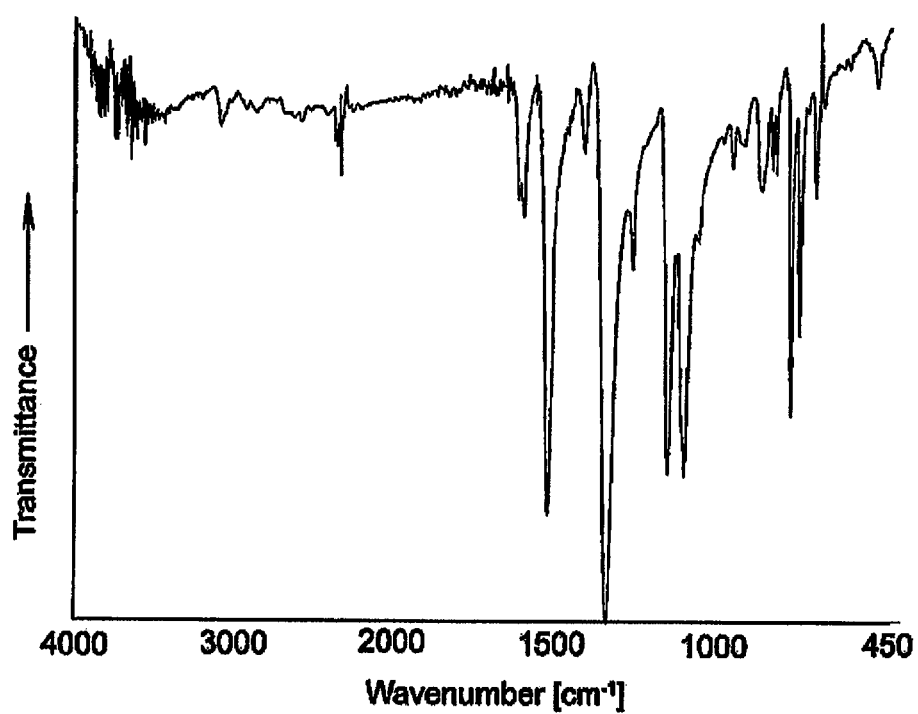
FIG. 1 is an IR spectrum of TNCoPc.

Hereinafter, the present invention will be described in detail.

1. Metal Phthalocyanine Polymer

The metal phthalocyanine polymer of the present invention (hereinafter, simply referred to as "metal phthalocyanine polymer") is a metal phthalocyanine polymer comprising a repeating structural unit obtained by the amide bonding of a structural unit represented by general formula (1a) to a structural unit represented by general formula (2a).

[Chemical Formula 9]

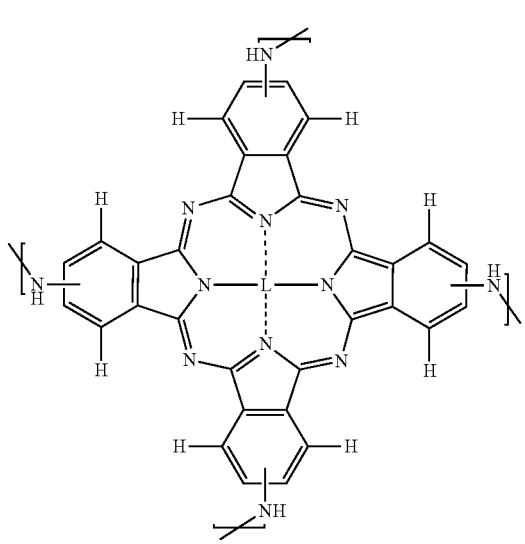

(1a)

(wherein L is a divalent or trivalent metal ion belonging to Period 3 to Period 5 on the long-form periodic table.)

[Chemical Formula 10]

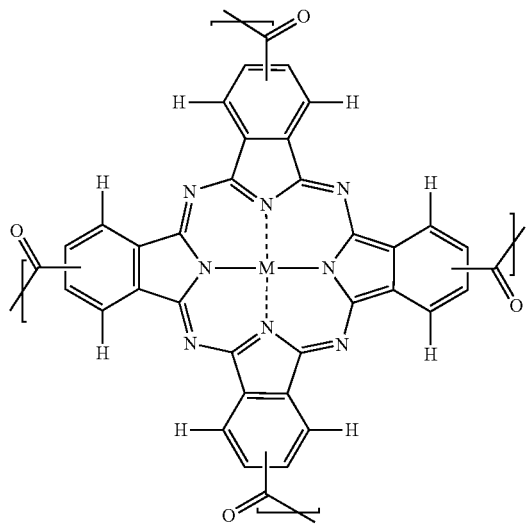

(2a)

(wherein M is a divalent or trivalent metal ion belonging to Period 3 to Period 5 on the long-form periodic table.)

As described above, the metal phthalocyanine polymer has a hyperbranched structure comprising a repeating unit of the general formula (1a) and a repeating unit of the general formula (2a) arranged alternately and repeatedly. Therefore, phthalocyanine cores M and L contained in each repeating unit are alternately arranged with regularity.

Here, the divalent metal ion constituting L and M includes $Mg^{2+}$, $Ca^{2+}$, $Sr^{2+}$, $Cd^{2+}$, $Ni^{2+}$, $Zn^{2+}$, $Cu^{2+}$, $Fe^{2+}$, $Co^{2+}$, $Sn^{2+}$, $Mn^{2+}$, and the like. Also, the trivalent metal ions include $Al^{3+}$, $Fe^{3+}$, $Cr^{3+}$, and the like. As described above, in the present invention, since a noble metal such as platinum is not used, it is possible to provide an inexpensive metal phthalocyanine polymer.

Among them, it is preferred that L and M are each independently a metal ion selected from the group consisting of $Co^{2+}$, $Ni^{2+}$ and $Fe^{2+}$. These three types of metal ions are a transition metal, can form a complex with various ligands, are relatively easily available and inexpensive, have low toxicity, and are excellent more than other metal ions based on these reasons, thus are preferred. Particularly, it is preferred that L and M are $Co^{2+}$, L is $Co^{2+}$ and M is $Ni^{2+}$, or L is $Co^{2+}$ and M is $Fe^{2+}$. As described above, L and M are different metals, and thereby, when the metal phthalocyanine polymer is calcined to form a carbon electrode material as described below, it is possible to search a cooperative effect of a different metal. In addition, the electrode catalyst contains a different metal, thereby obtaining a mixing effect of a different metal generally observed in an organic chemistry catalytic reaction, as compared with the case of containing only one type of metal, thus is preferred.

2. Method for Producing Metal Phthalocyanine Polymer

The metal phthalocyanine polymer can be produced by synthesizing a metal aminophthalocyanine compound represented by general formula (1) (Step 1), and in parallel with this, synthesizing a metal carboxyphthalocyanine compound represented by general formula (2) (Step 2), and condensing the obtained metal aminophthalocyanine compound and the obtained metal carboxyphthalocyanine compound (Step 3). Hereinafter, each step will be described in detail.

[Chemical Formula 11]

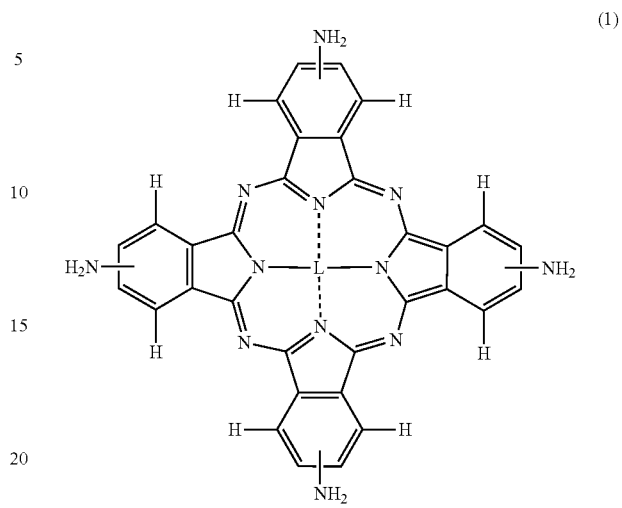

(1)

(wherein L is a divalent or trivalent metal ion belonging to Period 3 to Period 5 on the long-form periodic table.)

[Chemical Formula 12]

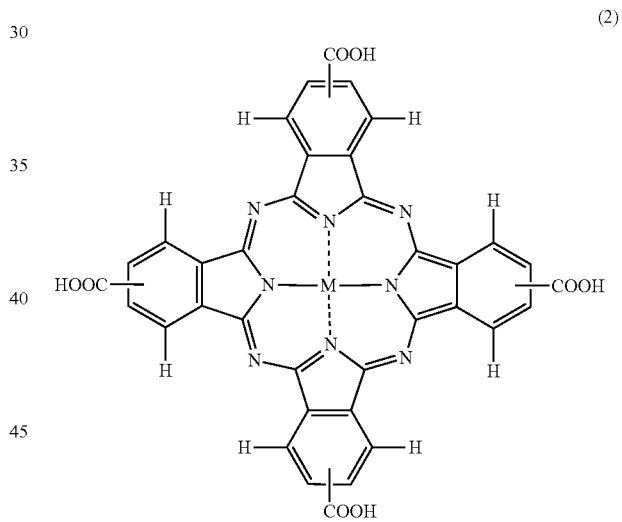

(2)

(wherein M is a divalent or trivalent metal ion belonging to Period 3 to Period 5 on the long-form periodic table.)

(1) Synthesis of Metal Aminophthalocyanine Compound (Step 1)

The metal aminophthalocyanine compound represented by the general formula (1) can be synthesized by synthesizing a metal nitrophthalocyanine compound (Step 1-1) and reducing a nitro group of the synthesized metal nitrophthalocyanine compound into an amino group (Step 1-2). Hereinafter, these steps will be described in detail.

(1-1) Production of Metal Nitrophthalocyanine Compound (Step 1-1)

The metal nitrophthalocyanine compound represented by the following general formula (4) can be produced by reacting a 4-nitrophthalic acid represented by the following general formula (3), or an acid anhydride thereof, an imide thereof or the like, with a metal salt including the L, urea, and catalyst, in the presence of a solvent, as necessary. Examples of the metal salt including the L include cobalt(II) chloride, nickel(II) chloride, iron(II) chloride, and the like. Examples of the catalyst include ammonium molybdate, and the like. Examples of the solvent include nitrobenzene, trichlorobenzene, triglyme, and the like. The reaction temperature and the reaction time can appropriately be set, for example, at 150 to 230° C., and 4 to 12 hours. As a method for synthesizing a metal nitrophthalocyanine, for example, JP 11-56989 A, JP 10-101673 A, JP 53-75223 A and the like can be referred.

[Chemical Formula 13]

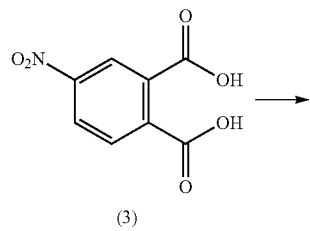

(3)

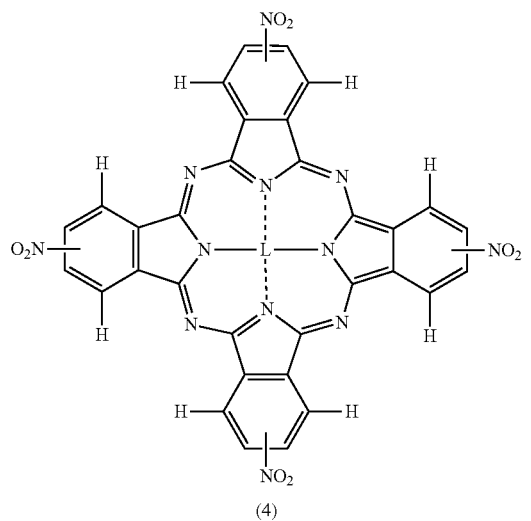

(4)

(1-2) Production of Metal Aminophthalocyanine Compound (Step 1-2)

The metal aminophthalocyanine represented by the following general formula (1) can be produced by reducing a nitro group of the metal nitrophthalocyanine represented by the following general formula (4). The reduction can be performed using a reducing agent and, as appropriate, a solvent. Examples of the reducing agent include sodium sulfide (Na2S, Na2S2, etc.), sodium hydrosulfide, sodium dithionite, ammonium sulfide, and the like. In this case, the solvent includes water, and water also serves as a proton source. The reaction temperature and the reaction time can appropriately be set, for example, at 50 to 80° C., and 4 to 12 hours. As a method for synthesizing a metal aminophthalocyanine, for example, JP 11-56989 A, "Shin-Jikken Kagaku Koza 14, Synthesis and Reaction of Organic Compound III, pages 1332 to 1335, (1978), MARUZEN CO., LTD." and the like can be referred.

[Chemical Formula 14]

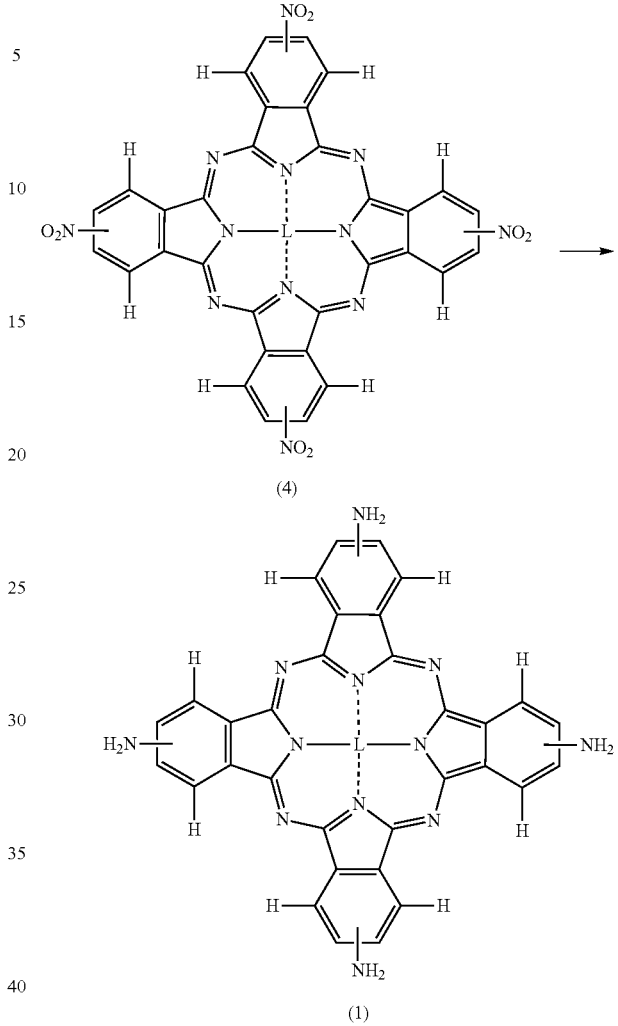

(2) Synthesis of Metal Carboxyphthalocyanine Compound (Step 2)

The metal carboxyphthalocyanine compound represented by the general formula (2) can be synthesized by synthesizing a metal carboxamidephthalocyanine compound (Step 2-1) and hydrolyzing a carboxamide group of the synthesized metal carboxamidephthalocyanine compound (Step 2-2). Hereinafter, these steps will be described in detail.

The metal carboxamidephthalocyanine compound represented by the following general formula (6) can be produced by reacting a trimellitic acid anhydride represented by the following general formula (5), with a metal salt including the M, urea, and catalyst, in the presence of a solvent, as necessary. Examples of the metal salt including the M include cobalt(II) chloride, nickel(II) chloride, iron(II) chloride, and the like. Examples of the catalyst include ammonium molybdate, and the like. Examples of the solvent include nitrobenzene, trichlorobenzene, triglyme, and the like. The reaction temperature and the reaction time can appropriately be set, for example, at 150 to 230° C., and 4 to 12 hours. As a method for synthesizing a metal carboxamidephthalocyanine, for example, JP 11-56989 A, JP 10-101673 A, JP 53-75223 A and the like can be referred.

[Chemical Formula 15]

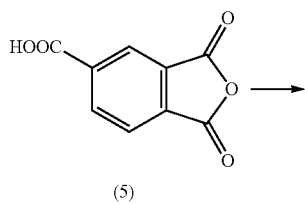

(5)

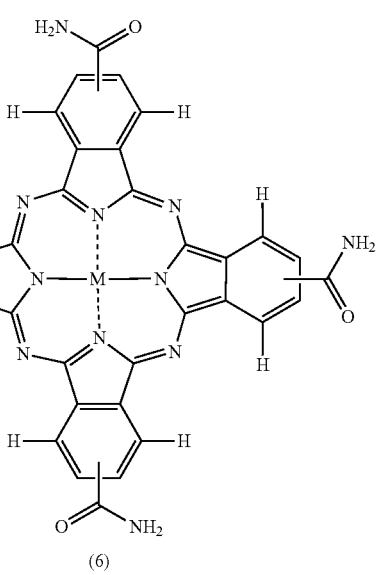

(6)

[Chemical Formula 16]

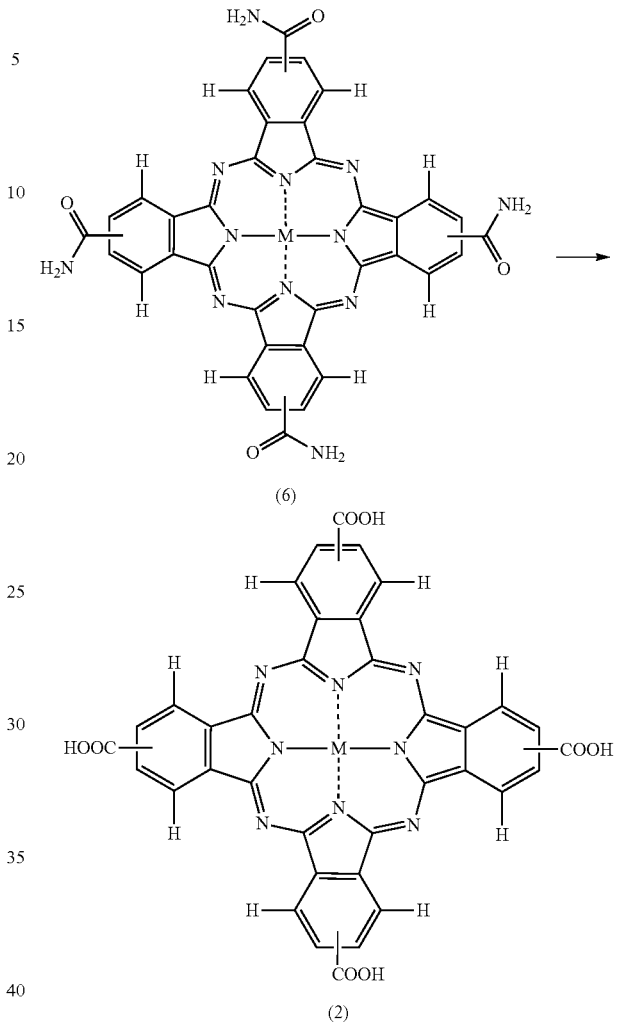

(2-2) Production of Metal Carboxyphthalocyanine Compound (Step 2-2)

The metal carboxyphthalocyanine compound represented by the following general formula (2) can be produced by hydrolyzing a carboxamide group of the metal carboxamidephthalocyanine represented by the following general formula (6). Hydrolysis can be performed by a method usually used by a person skilled in the art. Hydrolysis can be performed using, for example, an aqueous alkali solution such as an aqueous potassium hydroxide solution and an aqueous sodium hydroxide solution. The reaction temperature and the reaction time can appropriately be set, for example, at 80 to 120° C., and 20 to 30 hours. As a method for synthesizing a metal carboxyphthalocyanine, for example, JP 11-56989 A, "Shin-Jikken Kagaku Koza 14, Synthesis and Reaction of Organic Compound II, pages 943 to 947, (1977), MARUZEN CO., LTD." and the like can be referred.

(3) Production of Metal Phthalocyanine Polymer (Step 3)

The metal phthalocyanine polymer compound represented by the following general formula (7) can be produced by forming an amide bonding between the amino group of the metal aminophthalocyanine compound represented by the following general formula (1) and the carboxyl group of the metal carboxyphthalocyanine compound represented by the following general formula (2). The condensation reaction is preferably performed in the presence of a condensing agent. Examples of the condensing agent include triphenyl phosphite, but are not limited thereto. When triphenyl phosphite is used as a condensing agent, pyridine is preferably used. Furthermore, when triphenyl phosphite is used as a condensing agent, metal salts such as lithium chloride and calcium chloride can be added. The condensation reaction can be performed in the presence of a solvent. The solvent used in the condensation reaction includes dimethylformamide (DMF), N-methyl pyrrolidone (NMP), and the like.

The use ratio of the metal aminophthalocyanine compound represented by the following general formula (1) and the metal carboxyphthalocyanine compound represented by the following general formula (2) can appropriately be set, and as the use ratio, for example, the ratio (a)/(b) of the molar number of the used metal aminophthalocyanine compound (a) and the molar number of the used metal carboxyphthalocyanine compound (b) is 0.8 to 1.2, preferably 0.9 to 1.1, and more preferably 1. When triphenyl phosphite is used as a condensing agent, the use amount of triphenyl phosphite can appropriately be set, and examples of the use amount of triphenyl phosphite are the range of 2 to 40 mol, preferably 4 to 30 mol, more preferably 10 to 30 mol, and further preferably 15 to 25 mol, based on 1 mol of the metal aminophthalocyanine compound represented by the following general formula (1). When triphenyl phosphite is used as a condensing agent, the use amount of pyridine can appropriately be set, and examples of the use amount of pyridine are the range of 6 to 120 mol, preferably 12 to 90 mol, more preferably 30 to 90 mol, and further preferably 45 to 75 mol, based on 1 mol of the metal aminophthalocyanine compound represented by the following general formula (1). Also, pyridine can be used and also serves as a solvent, regardless of the use amount exemplified herein. When triphenyl phosphite is used as a condensing agent, the use amount of the metal salts such as lithium chloride and calcium chloride can appropriately be set, and examples of the use amount thereof are the range of 0 to 50 mol, preferably 10 to 40 mol, and more preferably 20 to 30 mol, based on 1 mol of the metal aminophthalocyanine compound represented by the following general formula (1).

The use amount of the solvent can appropriately be set, and examples of the use amount of the solvent are the range of 0.5 to 100 L (liter), preferably 5 to 50 L, and more preferably 10 to 30 L, based on 1 mol of the metal aminophthalocyanine compound represented by the following general formula (1). The reaction temperature can appropriately be set, and the reaction temperature can be set, for example, to the range of 50 to 180° C., preferably 80 to 150° C., and more preferably 80 to 120° C. The reaction time can appropriately be set, and the reaction time can be set, for example, to 1 to 48 hours, preferably 1 to 24 hours, more preferably 1 to 12 hours, and further preferably 2 to 5 hours. As a condensation reaction, for example, "Journal of Organic Chemistry Vol. 71, (2006) p. 2874 to 2877", "Organic Letters Vol. 7, No. 9, (2005) p. 1737 to 1739", "Shin-Jikken Kagaku Koza 14, Synthesis and Reaction of Organic Compound II, pages 1136 to 1141, (1977), MARUZEN CO., LTD." and the like can be referred.

[Chemical Formula 17]

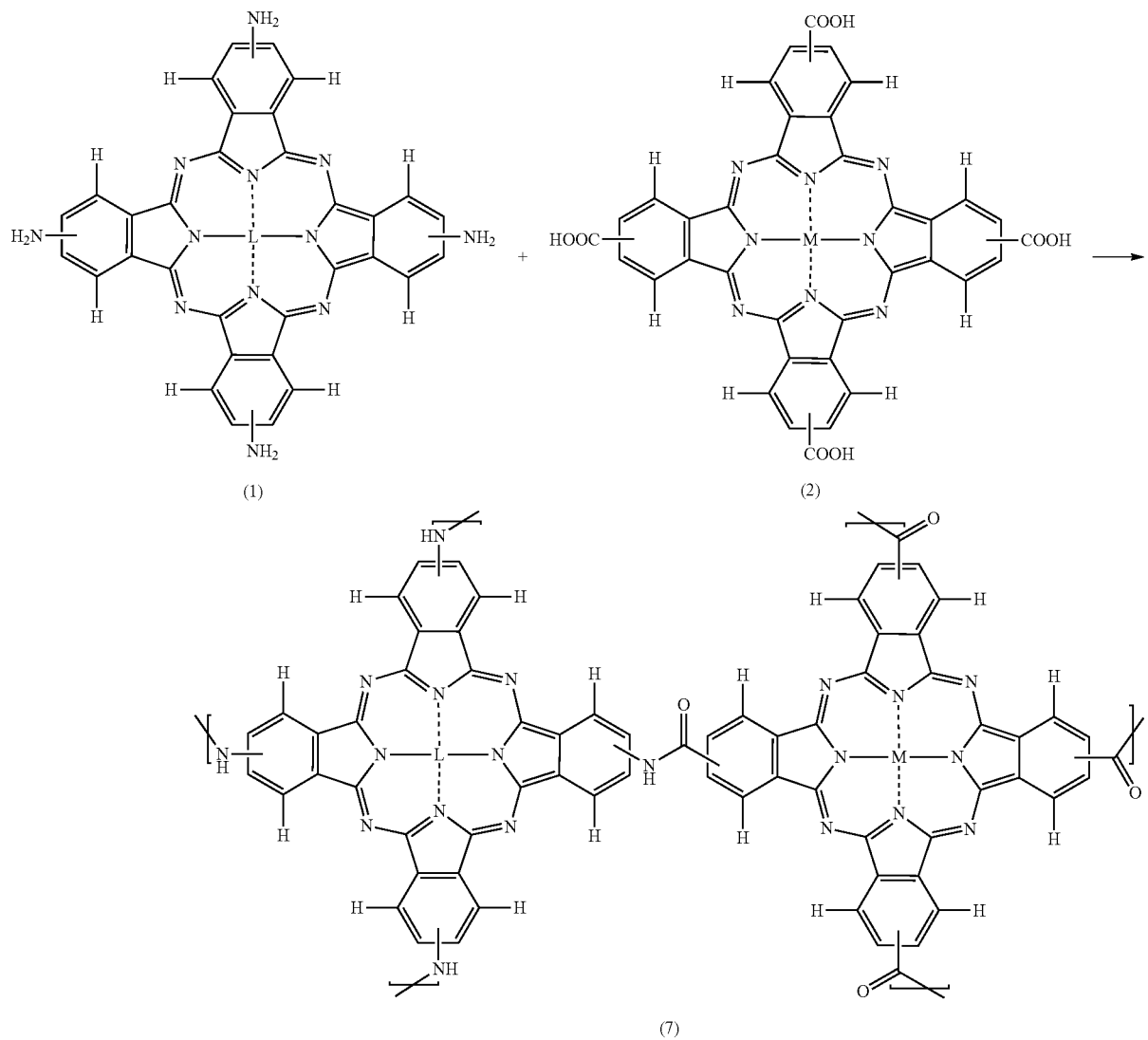

The metal phthalocyanine polymer obtained as above has a repeating structural unit obtained by amide bonding of a structural unit represented by the general formula (1a) to a structural unit represented by the general formula (2a) as described above, and is presumed to have a structure as the general formula (7), namely have an amide structure.

3. Electrode Catalyst

The electrode catalyst of the present invention (hereinafter, simply referred to as electrode catalyst) can be obtained by using the above metal phthalocyanine polymer as a precursor and carbonizing it. The electrode catalyst shows oxygen reduction activity, and can be suitably used as an electrode material of a fuel cell. As described above, since the metal phthalocyanine polymer does not use platinum, the electrode catalyst obtained by carbonizing it also does not contain platinum, thus is inexpensive. Also, the metal phthalocyanine polymer has a high carbon content, and has a phthalocyanine skeleton regularly bound, thus the obtained electrode catalyst also has a high carbon content, and is excellent in metal dispersibility. Furthermore, one metal L and other metal M of the metal phthalocyanine polymer are different metals, and thereby it is possible to incorporate two types of metals into the electrode catalyst and diversify characteristics of the electrode catalyst. Therefore, it is useful in searching an electrode catalyst having more excellent characteristics.

4. Method for Producing Electrode Catalyst

The electrode catalyst can be produced by calcining a metal phthalocyanine polymer. The heating temperature on calcination is 650 to 1500° C., preferably 800 to 1000° C., and particularly preferably 850° C. to 950° C. When the calcination temperature is below 650° C., calcination is insufficient, and oxygen reduction activity is unlikely to be expressed, thus is not preferred. Also, when the calcination temperature is above 1500° C., the calcination temperature is too high, thus the structure of carbon is broken, and oxygen reduction activity is unlikely to be expressed, thus is not preferred by reason of the reduction of yield. As the calcination time, 0.1 to 12 hours can be exemplified, and the calcination time is preferably 0.5 to 6 hours, more preferably 1 to 5 hours, and particularly preferably 2 to 4 hours.

Calcination is preferably performed in a reducing gas atmosphere or an inert gas atmosphere, and particularly preferably performed in a reducing gas atmosphere based on the reason that metal can be reduced during calcination. The reducing gas includes hydrogen, carbon monooxide, hydrogen sulfide, and the like. Also, the inert gas includes nitrogen, argon, and the like. The oxygen concentration in these gases is preferably 100 ppm or less, more preferably 20 ppm or less, and particularly preferably 10 ppm or less, on the volume basis. As a method for producing an electrode catalyst, JP 2011-6283 A, JP 2009-57314 A and the like can be referred.

The electrode catalyst after calcination can be formed into a catalyst carrying electrode, by being applied to the surface of an electrode material such as glassy carbon, or the like. The electrode catalyst is preferably applied after being dispersed by ultrasonic wave or the like, in the presence of a solvent or a dispersing agent. The concentration of the dispersing agent is usually 0.5 to 20% by weight or so, and preferably 1 to 10% by weight or so. As the method of application, other than the method of simply adding a dispersed solution dropwise, a method using a known apparatus such as a screen printer, a roll coater or a gravure coater may be used. After application, the electrode catalyst is dried for several hours to several days at ordinary temperature or high temperature.

EXAMPLES

Hereinafter, the present invention is specifically described with reference to Examples, but these Examples do not limit the object of the present invention.

1. Example 1 (Synthesis of Poly(Tetraamino Cobalt Phthalocyanine-Tetracarboxy Cobalt Phthalocyanine))

(1) Synthesis of Tetranitro Cobalt Phthalocyanine (Compound of General Formula (4))

A 500-ml recovery flask was charged with 10.051 g (0.05 mol) of 4-nitrophthalic acid, 4.001 g (0.031 mol) of cobalt chloride, 30.004 g (0.500 mol) of urea, 1.041 g (0.005 mol) of ammonium molybdate and 150 ml of nitrobenzene, and the mixture was stirred at 180° C. for 8 hours. After the completion of the reaction, the mixture was washed by filtration using methanol, and boiled in 350 ml of an aqueous 1 N HCl solution (NaCl saturated). After cooling overnight, the solution was washed by filtration using pure water and methanol, and dried at 80° C. under reduced pressure. This operation was repeated twice. The resulting solid was boiled in 200 ml of pure water, and after cooling, the solid was washed by filtration using methanol, and dried at 80° C. under reduced pressure. This operation was repeated twice to obtain tetranitro cobalt phthalocyanine (TNCoPc) that is deep blue powder. The amount of the obtained TNCoPC was 9.640 g, and the yield was 60%. FIG. 1 illustrates an IR spectrum of TNCoPc.

(2) Synthesis of Tetraamino Cobalt Phthalocyanine (Compound of General Formula (1))

Figure 2A:
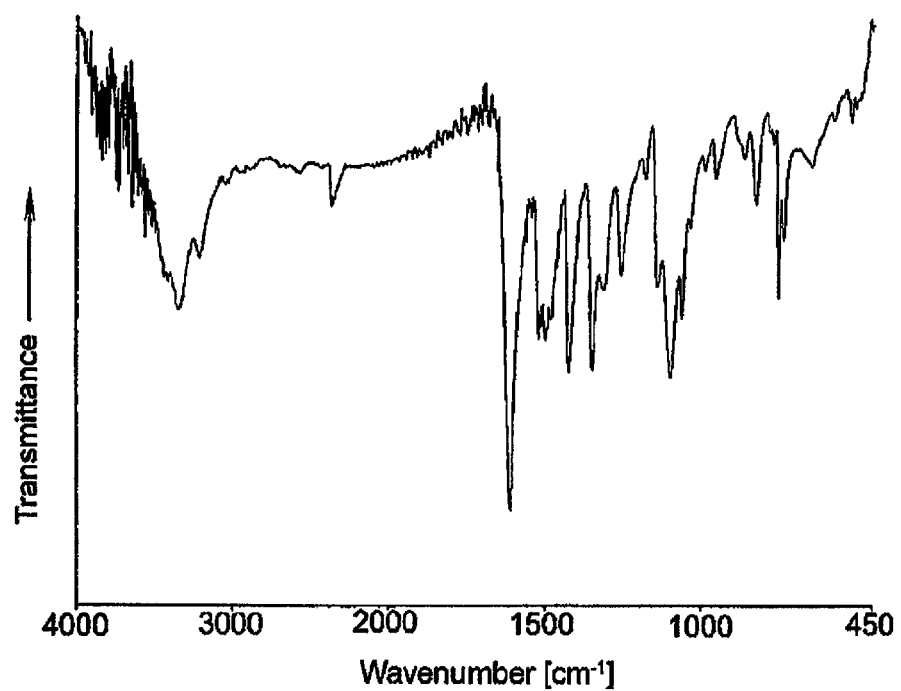
FIGS. 2A and 2B are a spectrum of IR (FIG. 2A) and thermogravimetric analysis result (FIG. 2B) of TACoPc.
Figure 2B:
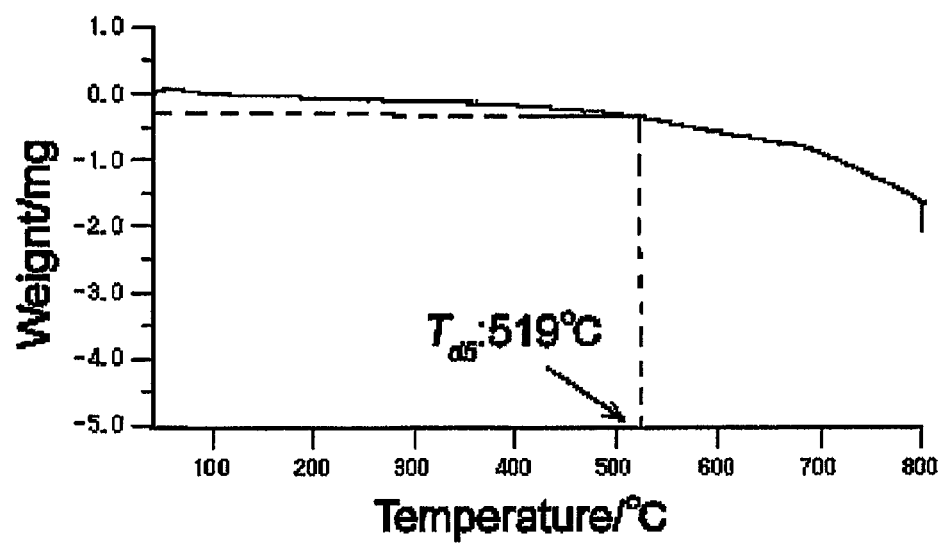

In a 500-ml recovery flask, 5.004 g of the obtained TNCoPc, 25.000 g (0.104 mol) of sodium sulfide and 150 ml of pure water were mixed, and the mixture was stirred at 65° C. for 8 hours. After the completion of the reaction, the mixture was washed by filtration using pure water and methanol, and boiled using a 5% aqueous sodium hydroxide solution. After cooling, the solution was washed by filtration using pure water and methanol, and dried at 80° C. under reduced pressure. Thereafter, the resulting TACoPc was dissolved in 1 N HCl, and the solution was filtered. The filtered solution was adjusted to a pH of 8 by adding an aqueous KOH solution, and boiled. After cooling, the solution was washed by filtration using pure water and methanol. The collected solid was dried at 80° C. under reduced pressure. This operation was repeated twice to obtain tetraamino cobalt phthalocyanine (TACoPc) that is deep blue solid. The amount of the obtained TACoPc was 1.493 g, and the yield was 29%. FIGS. 2A and 2B illustrate an IR spectrum and thermogravimetric analysis result of TACoPc.

(3) Synthesis of Tetracarboxamide Cobalt Phthalocyanine (Compound of General Formula (6))

Figure 3:
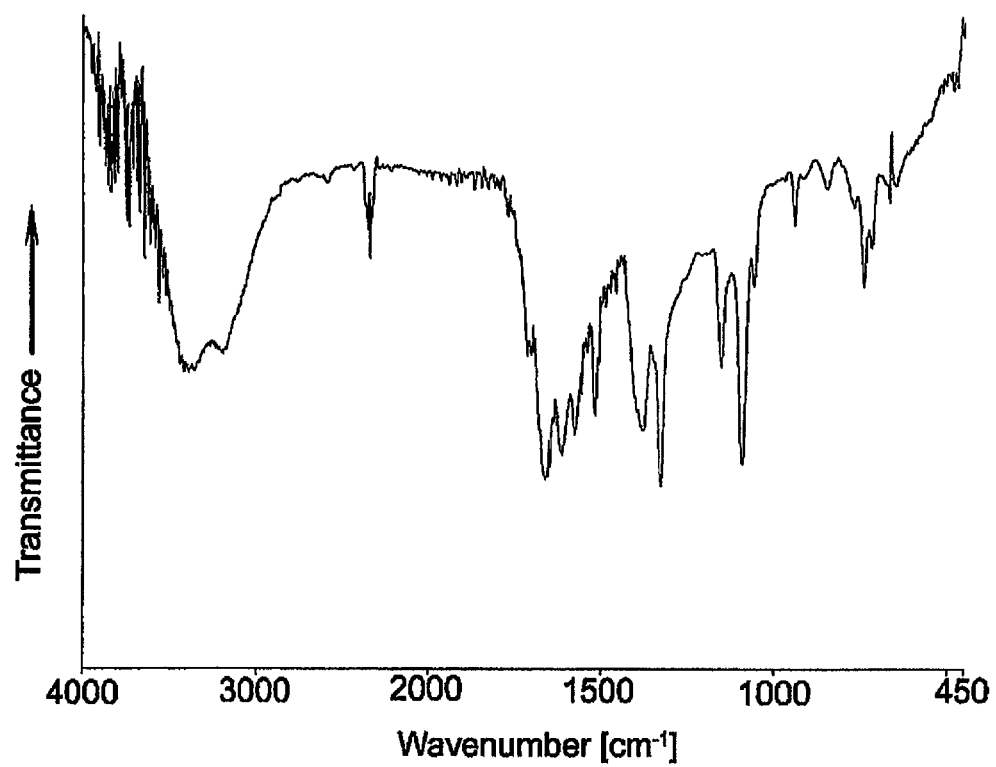
FIG. 3 is an IR spectrum of TAmCoPc.

A 500-ml recovery flask was charged with 10.004 g (0.052 mol) of a trimellitic acid anhydride, 4.010 g (0.031 mol) of cobalt chloride, 30.032 g (0.500 mol) of urea, 1.004 g (0.005 mol) of ammonium molybdate and 150 ml of nitrobenzene, and the mixture was stirred at 180° C. for 8 hours. After the completion of the reaction, the precipitate was washed by filtration using methanol and diethyl ether, and boiled in an aqueous 1 N HCl solution (NaCl saturated). After cooling overnight, the precipitate was washed by filtration using pure water, ethanol, and diethyl ether. The obtained solid was dried at 60° C. under reduced pressure. This operation was repeated twice to obtain tetracarboxamide cobalt phthalocyanine (TAmCoPc) that is blue green powder. The amount of the obtained TAmCoPc was 9.6732 g, and the yield was 92%. FIG. 3 illustrates an IR spectrum of TAmCoPc.

(4) Synthesis of Tetracarboxy Cobalt Phthalocyanine (Compound of General Formula (2))

Figure 4A:
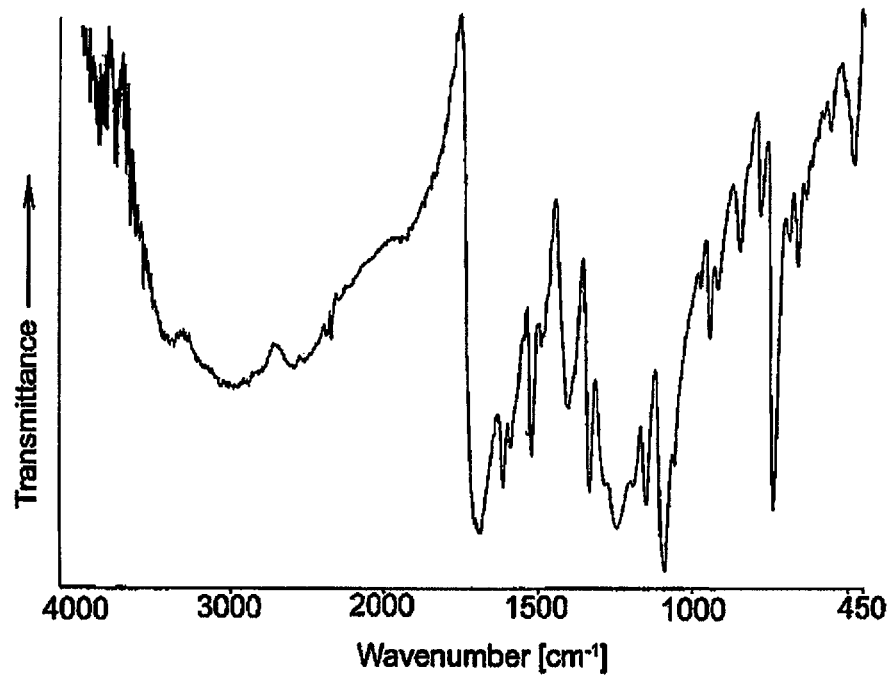
FIGS. 4A and 4B are an IR spectrum (FIG. 4A) and thermogravimetric analysis result (FIG. 4B) of TCaCoPc.
Figure 4B:
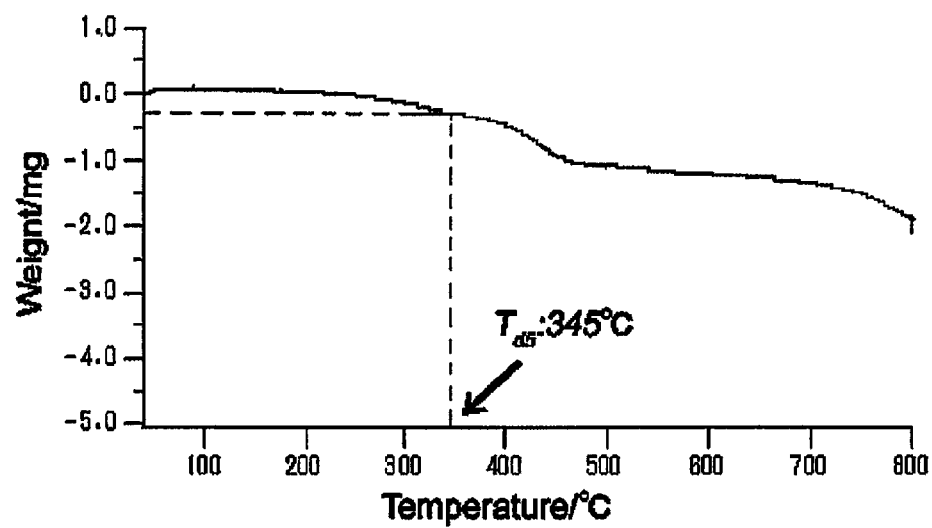

In a 500-ml recovery flask, 9.640 g of TAmCoPc, 60 g of KOH and 60 ml of pure water were stirred at 100° C. for 24 hours. After the completion of the reaction, the mixture was adjusted to a pH of 2 by adding 100 ml of pure water and concentrated HCl, and filtered. The obtained solid was washed by filtration using pure water, ethanol and diethyl ether, and added to 200 ml of pure water, and the mixture was adjusted to a pH of 10 using an aqueous 0.1 N KOH solution to filter a dissolved matter. The filtrate was adjusted to a pH of 2 by adding concentrated hydrochloric acid, and washed by filtration using pure water, ethanol, and diethyl ether. The obtained solid was dried at 100° C. under reduced pressure. This operation was repeated twice to obtain tetracarboxy cobalt phthalocyanine (TCaCoPc) that is purplish-red solid. The amount of the obtained TCaCoPc was 7.5740 g, and the yield was 75%. FIG. 4 illustrates an IR spectrum and thermogravimetric analysis result of TCaCoPc.

(5) Synthesis of Poly(Tetraamino Cobalt Phthalocyanine-Tetracarboxy Cobalt Phthalocyanine) (Compound of General Formula (7))

Figure 5A:
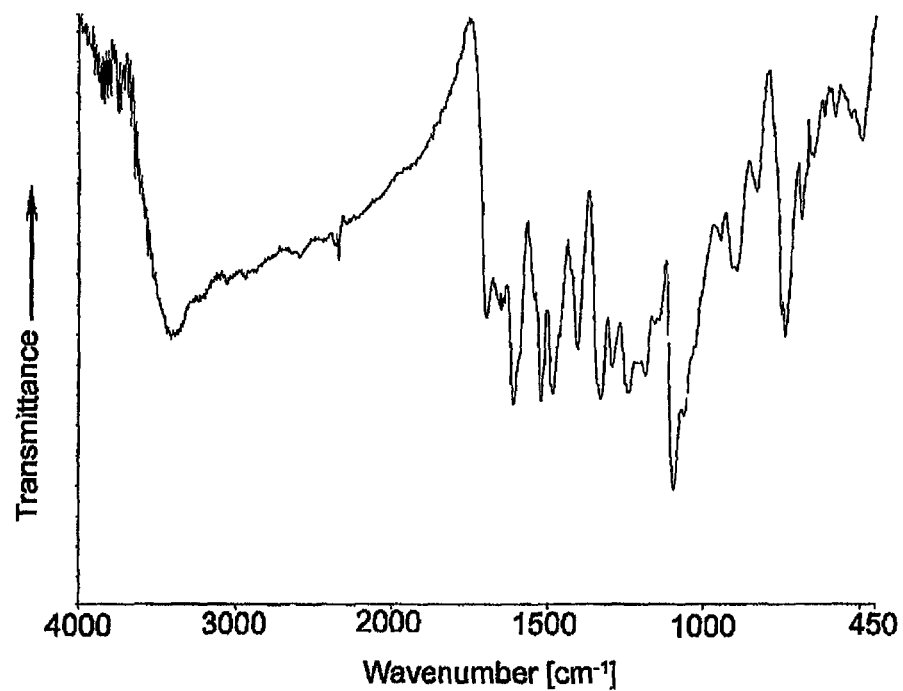
FIGS. 5A and 5B are an IR spectrum (FIG. 5A) and thermogravimetric analysis result (FIG. 5B) of Poly(TA-CoPc-TCaCoPc).
Figure 5B:
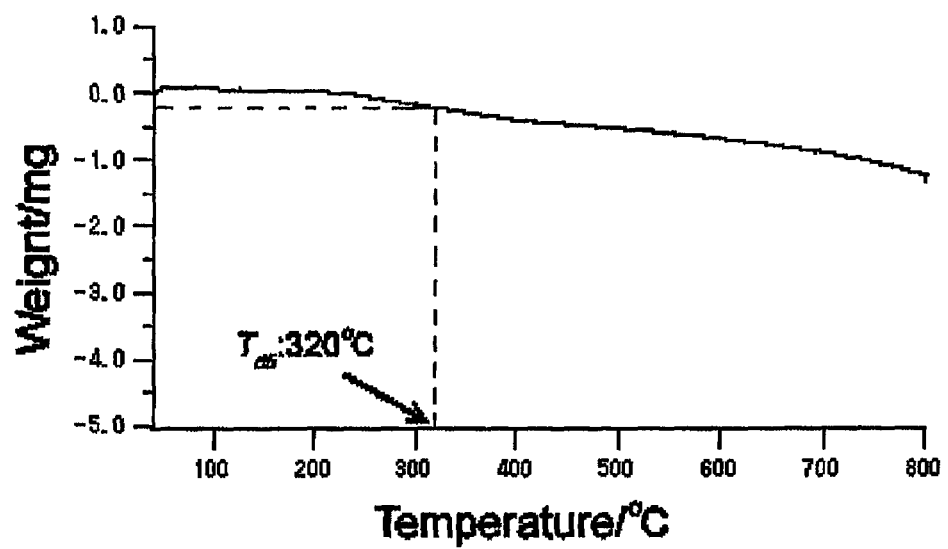

A 50-ml two-necked flask was charged with 0.3457 g (0.5 mmol) of TACoPc, 0.4065 g (0.5 mmol) of TCaCoPc, 2.618 ml (10 mmol) of triphenyl phosphite, 0.5034 g (12 mmol) of lithium chloride, 10 ml of DMF and 2.5 ml of pyridine, and the mixture was stirred at 100° C. for 3 hours, in an argon atmosphere. The product was filtered, and washed with methanol and DMF. After washing, the product was dried at 80° C. under reduced pressure to obtain poly(tetraamino cobalt phthalocyanine-tetracarboxy cobalt phthalocyanine) (Poly(TACoPc-TCaCoPc)) that is deep blue solid. The amount of the obtained Poly(TACoPc-TCaCoPc) was 0.7034 g. FIG. 5 illustrates an IR spectrum and thermogravimetric analysis result of Poly(TACoPc-TCaCoPc).

(6) Preparation of Electrode Catalyst

For the preparation of the electrode, a method of Ozaki et al. (J. Ozaki et al./Carbon 45 (2007) 1847 to 1853) was applied. First, the obtained Poly(TACoPc-TCaCoPc) was left in an argon flow for an hour, then calcined in a hydrogen flow for 3 hours. The calcination temperature was three conditions of 900° C. (Example 1-1), 700° C. (Example 1-2), and 600° C. (Reference Example 1). After the completion of calcination, the residual solid was cooled in an argon flow and collected. The collected sample was passed through a 200-mesh sieve so as to have a particle size of 30 μm or less. 5 mg of the sample was weighed and put into a 0.5 mL microtube, and 50 μL of a 5% Nafion dispersion solution (Wako Pure Chemical Industries, Ltd.) and 150 μL of ethanol, and 150 μL of pure water were added and sealed, and the microtube was subjected to ultrasonic waves for 30 minutes to be dispersed. 1 μL of the prepared ink-like solution was added dropwise to the polished glassy carbon electrode (EC Frontier Co, Ltd.) with an inner diameter of 3 φ (outer diameter of 6 φ), and dried in a sealed container with a humidity of 100% a whole day and night to form an electrode catalyst. Production conditions and the like are shown in Table 1.

(b) Evaluation of Electrode Catalyst

Figure 6:
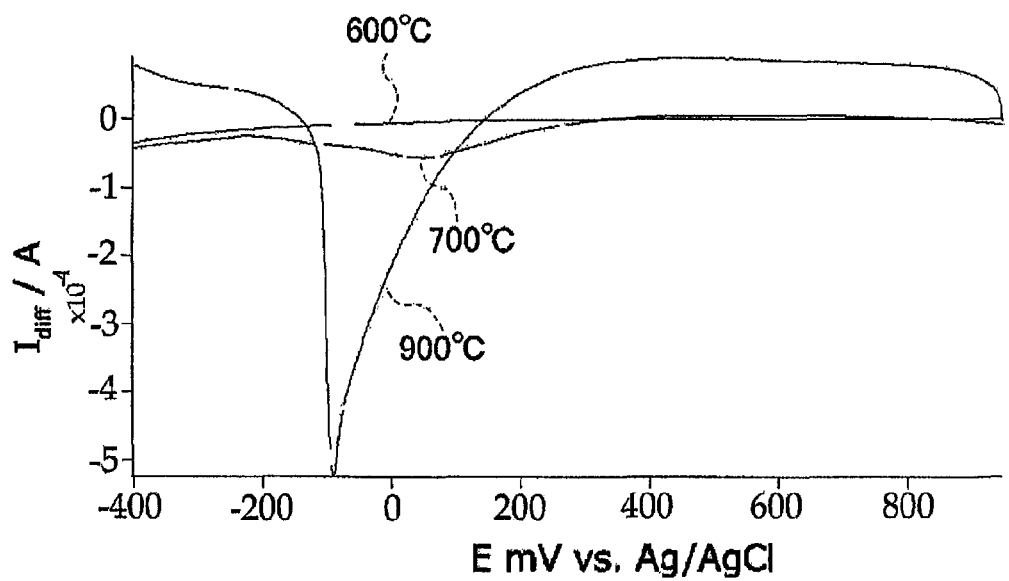
FIG. 6 is a graph showing a result of testing an electrode prepared changing the calcination temperature by a linear sweep voltammetry.

Electrolysis was carried out in 10 mL of 0.5 M H2SO4, using platinum plate as an auxiliary electrode, and an Ag/AgCl electrode (+0.199 V vs. SHE) as a standard electrode. The solution was bubbled with oxygen or nitrogen for 30 minutes before measurement. Measurement was performed by a linear sweep voltammetry at a working electrode potential from +900 mV to −400 mV at a scan rate of 100 mV/sec. The results are shown in FIG. 6.

While a clear peak of oxygen reduction could not be confirmed at a calcination temperature of 600° C. from the result of this figure, a small peak could be confirmed at around 200 mV at 700° C., and a clear peak could be confirmed at 900° C. Therefore, it is considered that the calcination temperature is preferably a temperature higher than 600° C.

2. Example 2 (Synthesis of Poly(Tetraamino Cobalt Phthalocyanine-Tetracarboxy Nickel Phthalocyanine))

Tetracarboxamide nickel phthalocyanine (TAmNiPc) was synthesized in the same manner as in "(3) Synthesis of tetracarboxamide cobalt phthalocyanine (compound of general formula (6))" in Example 1, except for using 4.018 g (0.031 mol) of nickel(II) chloride, in place of cobalt chloride. The resulting (TAmNiPc) was hydrolyzed in the same conditions as in "(4) Synthesis of tetracarboxy cobalt phthalocyanine (compound of general formula (2))" in Example 1 to synthesize tetracarboxy nickel phthalocyanine (TCaNiPc). The resulting (TCaNiPc) and TACoPc obtained in Example 1 were condensed in the same conditions as in Example 1 (5), to obtain poly(tetraamino cobalt phthalocyanine-tetracarboxy nickel phthalocyanine) (Poly(TACoPc-TCaNiPc)). An electrode catalyst was prepared in the same conditions as in "(6) Preparation of electrode catalyst" using the resulting Poly(TACoPc-TCaNiPc). Production conditions and the like are shown in Table 2.

3. Example 3 (Synthesis of Poly(Tetraamino Cobalt Phthalocyanine-Tetracarboxy Iron Phthalocyanine))

Tetracarboxamide iron phthalocyanine (TAmFePc) was synthesized in the same manner as in "(3) Synthesis of tetracarboxamide cobalt phthalocyanine (compound of general formula (6))" in Example 1, except for using 4.943 g (0.039 mol) of iron(II) chloride, in place of cobalt chloride. The resulting (TAmFePc) was hydrolyzed in the same conditions as in "(4) Synthesis of tetracarboxy cobalt phthalocyanine (compound of general formula (2))" in Example 1 to synthesize tetracarboxy iron phthalocyanine (TCaFePc). The resulting (TCaFePc) and TACoPc obtained in Example 1 were condensed in the same conditions as in Example 1 (5), to obtain poly(tetraamino cobalt phthalocyanine-tetracarboxy iron phthalocyanine) (Poly(TACoPc-TCaFePc)). An electrode catalyst was prepared in the same conditions as in "(6) Preparation of electrode catalyst" using the resulting Poly(TACoPc-TCaFePc). Production conditions and the like are shown in Table 2.

TABLE 1

| | Phthalocyanine | Temperature (° C.) | Feed amount (g) | Yield (g) | Obtained amount (%) |
|---|---|---|---|---|---|
| Example 1-1 | Poly(TACoPc•TCaCoPc) | 900 | 0.6691 | 0.1892 | 28 |
| Example 1-2 | Poly(TACoPc•TCaCoPc) | 700 | 0.6007 | 0.2310 | 38 |
| Reference Example 1 | Poly(TACoPc•TCaCoPc) | 600 | 0.6007 | 0.2310 | 38 |

TABLE 2

| Phthalocyanine | Temperature (° C.) | Feed amount (g) | Yield (g) | Obtained amount (%) |
|---|---|---|---|---|
| Example 2 Poly(TACoPc•TCaNiPc) | 600 | 0.6976 | 0.4350 | 62 |
| Example 3 Poly(TACoPc•TCaFePc) | 600 | 0.7001 | 0.3512 | 50 |

As described above, it has been found that two types of metal phthalocyanine each containing a different metal are condensed, and thereby a metal phthalocyanine polymer containing different metals can be obtained, and furthermore, this metal phthalocyanine polymer is calcined as a precursor, thereby obtaining an electrode catalyst containing different metals.

The invention claimed is:

1. A metal phthalocyanine polymer comprising a repeating structural unit obtained by amide bonding of a structural unit represented by general formula (1a)

(1a)

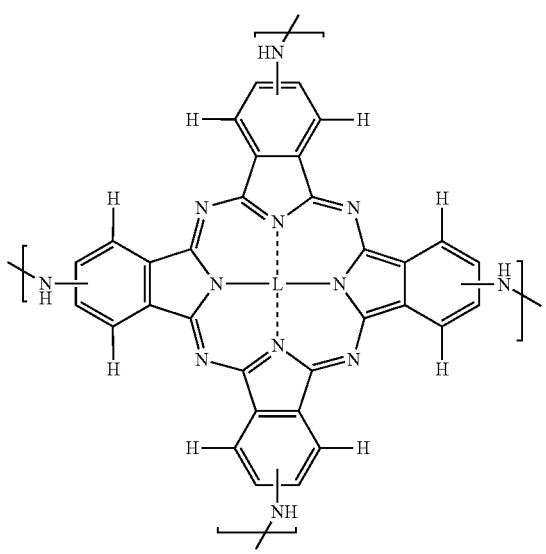

wherein L is a divalent or trivalent metal ion belonging to Period 3 to Period 5 on the long-form periodic table, to a structural unit represented by general formula (2a)

(2a)

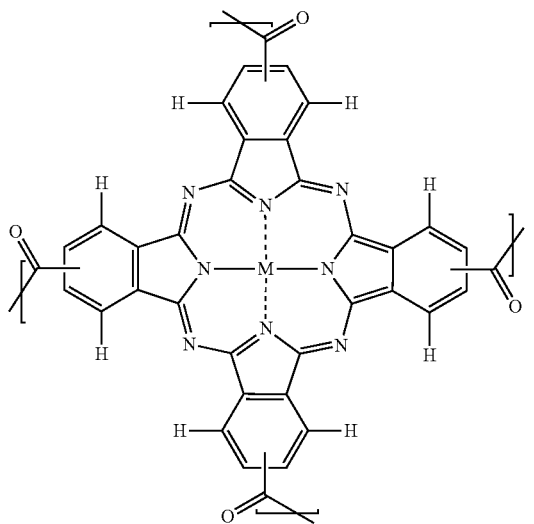

wherein M is a divalent or trivalent metal ion belonging to Period 3 to Period 5 on the long-form periodic table.

2. The metal phthalocyanine polymer according to claim 1, wherein the L and the M are each independently a metal ion selected from the group consisting of $Co^{2+}$, $Ni^{2+}$ and $Fe^{2+}$.

3. The metal phthalocyanine polymer according to claim 1, wherein the L and the M are $Co^{2+}$.

4. The metal phthalocyanine polymer according to claim 1, wherein the L is $Co^{2+}$, and the M is $Ni^{2+}$.

5. The metal phthalocyanine polymer according to claim 1, wherein the L is $Co^{2+}$, and the M is $Fe^{2+}$.

6. A metal phthalocyanine polymer according to claim 1, which is produced by condensation of a metal aminophthalocyanine compound represented by general formula (1)

(1)

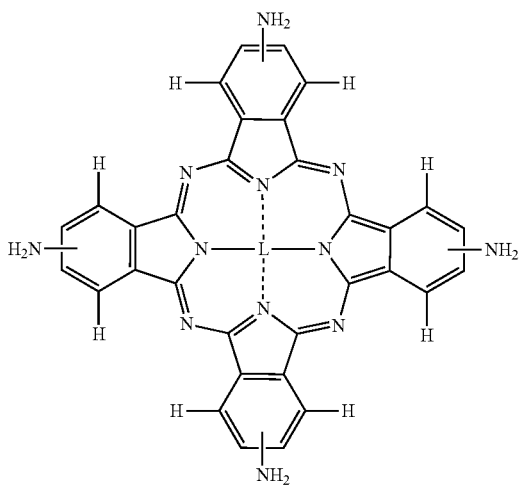

wherein L is a divalent or trivalent metal ion belonging to Period 3 to Period 5 on the long-form periodic table, and a metal carboxyphthalocyanine compound represented by general formula (2), (2)

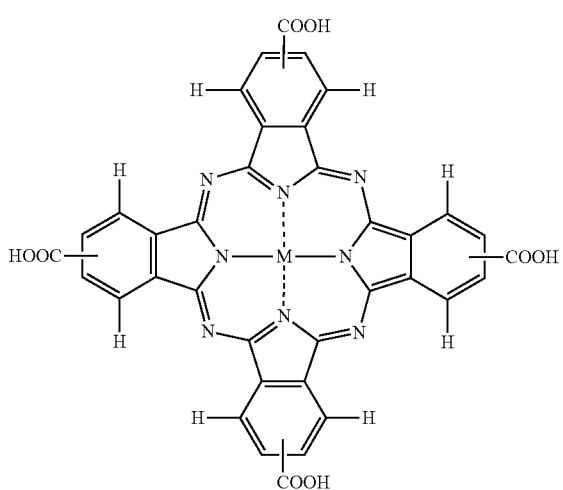

wherein M is a divalent or trivalent metal ion belonging to Period 3 to Period 5 on the long-form periodic table.

7. The metal phthalocyanine polymer according to claim 6, wherein the L and the M are each independently a metal ion selected from the group consisting of $Co^{2+}$, $Ni^{2+}$ and $Fe^{2+}$.

8. The metal phthalocyanine polymer according to claim 6, wherein the L and the M are $Co^{2+}$.

9. The metal phthalocyanine polymer according to claim 6, wherein the L is $Co^{2+}$, and the M is $Ni^{2+}$.

10. The metal phthalocyanine polymer according to claim 6, wherein the L is $Co^{2+}$, and the M is $Fe^{2+}$.

11. An electrode catalyst produced by calcining the metal phthalocyanine polymer according to claim 1, at 650° C. to 1500° C., in a reducing gas atmosphere or an inert gas atmosphere.

12. An electrode catalyst produced by calcining the metal phthalocyanine polymer according to claim 1, at 800° C. to 1000° C., in a reducing gas atmosphere or an inert gas atmosphere.

13. An electrode catalyst produced by calcining the metal phthalocyanine polymer according to claim 1, at 800° C. to 1000° C., in a reducing gas atmosphere.

14. A method for producing a metal phthalocyanine polymer according to claim 1, which comprises a repeating structural unit obtained by the amide bonding of a structural unit represented by general formula (1a) to a structural unit represented by general formula (2a), comprising condensing a metal aminophthalocyanine compound represented by general formula (1) and a metal carboxyphthalocyanine compound represented by general formula (2)

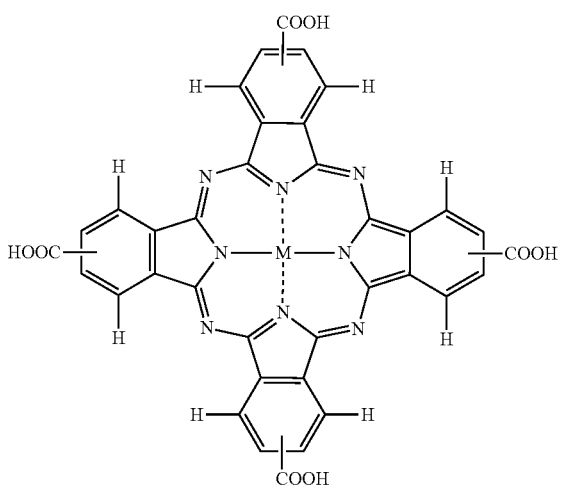

(2)

wherein M is a divalent or trivalent metal ion belonging to Period 3 to Period 5 on the long-form periodic table

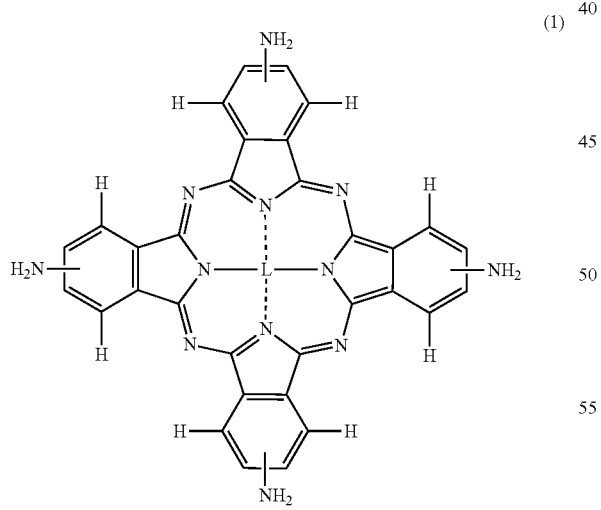

(1)

wherein L is a divalent or trivalent metal ion belonging to Period 3 to Period 5 on the long-form periodic table (1a)

wherein L is a divalent or trivalent metal ion belonging to Period 3 to Period 5 on the long-form periodic table

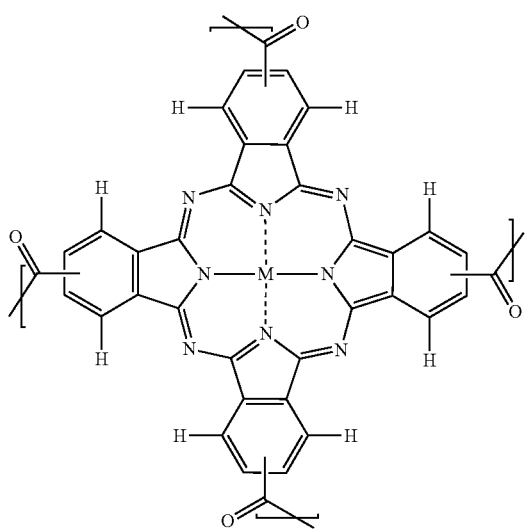

(2a)

wherein M is a divalent or trivalent metal ion belonging to Period 3 to Period 5 on the long-form periodic table.

15. The method for producing a metal phthalocyanine polymer according to claim 14, wherein the L and the M are each independently a metal ion selected from the group consisting of $Co^{2+}$, $Ni^{2+}$ and $Fe^{2+}$.

16. The method for producing a metal phthalocyanine polymer according to claim 14, wherein the L and the M are $Co^{2+}$.

17. The method for producing a metal phthalocyanine polymer according to claim 14, wherein the L is $Co^{2+}$, and the M is $Ni^{2+}$.

18. The method for producing a metal phthalocyanine polymer according to claim 14, wherein the L is $Co^{2+}$, and the M is $Fe^{2}+$.

19. A method for producing an electrode catalyst which comprises calcining the metal phthalocyanine polymer as defined in claim 1, at 650° C. to 1500° C., in a reducing gas atmosphere or an inert gas atmosphere.

20. A method for producing an electrode catalyst which comprises calcining the metal phthalocyanine polymer as defined in claim 1, at 800° C. to 1000° C., in a reducing gas atmosphere or an inert gas atmosphere.

21. A method for producing an electrode catalyst which comprises calcining the metal phthalocyanine polymer as defined in claim 1, at 800° C. to 1000° C., in a reducing gas atmosphere.

* * * * *

UNITED STATES PATENT AND TRADEMARK OFFICE
CERTIFICATE OF CORRECTION

PATENT NO. : 9,774,042 B2
APPLICATION NO. : 14/784337
DATED : September 26, 2017
INVENTOR(S) : Nobukatsu Nemoto et al.

It is certified that error appears in the above-identified patent and that said Letters Patent is hereby corrected as shown below:

On the Title Page

Column 1, Item (71), Applicant, Line 1, delete "Ihara Chemical Industry Co., Ltd." and insert
-- Kumiai Chemical Industry Co., Ltd. --

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*